US012651788B2

(12) United States Patent
Liang et al.

(10) Patent No.: US 12,651,788 B2
(45) Date of Patent: Jun. 9, 2026

(54) METAL-AIR FUEL BATTERY SYSTEM WITH FOLLOW-UP ADJUSTMENT OF LARGE-SIZED ANODE

(71) Applicant: TRANSLATIONAL RESEARCH CENTER, SCHOOL OF MECHANICAL AND VEHICLE, BEIJING INSTITUTE OF TECHNOLOGY, TANGSHAN PORT ECONOMIC DEVELOPMENT ZONE, Tangshan (CN)

(72) Inventors: Liang Liang, Tangshan (CN); Bingchen Han, Tangshan (CN); Wenshuo Li, Tangshan (CN); Weipeng Liu, Tangshan (CN); Hui Mo, Tangshan (CN); Yu Zhang, Tangshan (CN); Mingming Dong, Tangshan (CN); Zesen Chen, Tangshan (CN)

(73) Assignee: Translational Research Center, School of Mechanical and Vehicle, Beijing Institute of Technology, Tangshan Port Economic Development Zone, Hebei (CN)

( * ) Notice: Subject to any disclaimer, the term of this patent is extended or adjusted under 35 U.S.C. 154(b) by 0 days.

(21) Appl. No.: 18/282,044

(22) PCT Filed: Apr. 25, 2023

(86) PCT No.: PCT/CN2023/090497
§ 371 (c)(1),
(2) Date: Sep. 14, 2023

(87) PCT Pub. No.: WO2024/216658
PCT Pub. Date: Oct. 24, 2024

(65) Prior Publication Data
US 2026/0031437 A1     Jan. 29, 2026

(30)     Foreign Application Priority Data
Apr. 21, 2023    (CN) .......................... 202310430632.0

(51) Int. Cl.
| | |
|---|---|
| *H01M 12/08* | (2006.01) |
| *H01M 50/105* | (2021.01) |
| *H01M 50/121* | (2021.01) |
| *H01M 50/136* | (2021.01) |
| *H01M 50/77* | (2021.01) |
| *H04N 23/54* | (2023.01) |

(52) U.S. Cl.
CPC ......... *H01M 12/08* (2013.01); *H01M 50/105* (2021.01); *H01M 50/121* (2021.01); *H01M 50/136* (2021.01); *H01M 50/77* (2021.01); *H04N 23/54* (2023.01)

(58) Field of Classification Search
None
See application file for complete search history.

*Primary Examiner* — Carlos Barcena
(74) *Attorney, Agent, or Firm* — Weiss & Moy, PC; Jeffrey D. Moy

(57)          ABSTRACT

A metal-air fuel battery system with follow-up adjustment of a large-sized anode is provided, which relates to a technical field of a battery. The battery system includes a flexible case, a follow-up adjustment module and a drive mechanism, where the flexible case, as an electrochemical reaction space, is configured to accommodate an electrolyte solution and a metal ingot therein, and have a flexible air electrode embedded in an inner wall thereof; the follow-up adjustment module is configured to change a shape of the flexible case according to a size change of the metal ingot, to reduce the electrochemical reaction space; and the drive mechanism is configured to control action of the follow-up adjustment module.

9 Claims, 7 Drawing Sheets

METAL-AIR FUEL BATTERY SYSTEM WITH FOLLOW-UP ADJUSTMENT OF LARGE-SIZED ANODE

CROSS-REFERENCE TO RELATED APPLICATION

This application is a national stage application of International Patent Application No. PCT/CN2023/090497, filed on Apr. 25, 2023, which claims priority of the Chinese Patent Application No. 202310430632.0, filed on Apr. 21, 2023, both of which are incorporated by references in their entities.

TECHNICAL FIELD

The present disclosure relates to a technical field of a battery, and in particular to a metal-air fuel battery system with follow-up adjustment of a large-sized anode.

BACKGROUND

The metal-air fuel batteries have advantages of low costs, nontoxicity, non-pollution, a smooth discharge voltage, high safety, high specific energy and high specific power, and our country has rich metal resources, such as magnesium, aluminum, zinc, all of which can be used as anodes of the metal-air fuel batteries. Thus, the metal-air fuel batteries gradually become a new energy source with great development and application prospect. In recent years, with the developments and improvements of some theoretical processes, the metal-air fuel batteries have be widely used in the fields of energy storage, national defense, transportation equipment, and also have great development potential in some emerging energy industries.

The existing metal-air fuel batteries mostly use metal plates as battery anodes, limitations in sizes of the metal plates cause frequent replacements of anodes, and it takes much time and energy to process metal ingots into metal plates. The defects of the metal plates can be remedied by using large-sized standard cubic metal ingots directly as metal battery anodes. However, currently many metal batteries still employ rigidly fixed battery cases. In this case, as the chemical reaction goes on, the volume of the metal ingot is gradually reduced in a case that the size of the battery case is unchanged, and thus the distance between the surface of the metal ingot and the inner wall of the battery case with the air electrode embedded is increased, which decreases significantly the rate of the electrochemical reaction, and thus cannot ensure the sustainability and stability of the electrochemical reaction, thereby seriously affecting the performance of the metal-air fuel battery. This is a large technical obstacle for the widespread application of large-sized metal-air fuel battery.

SUMMARY

The present disclosure intends to provide a metal-air fuel battery system with follow-up adjustment of a large-sized anode, so as to solve the problems existing in the prior art described above, and a real-time adjustment of a size can be achieved by a follow-up adjustment mechanism according to a size change of an ingot during a reaction process, so as to ensure the sustainability and stability of an electrochemical reaction, thereby improving performance reliability of the metal-air fuel battery.

To achieve the above intention, the present disclosure provides the following solutions:

The present disclosure provides a metal-air fuel battery system with follow-up adjustment of a large-sized anode including a flexible case, a follow-up adjustment module and a drive mechanism. The flexible case, as an electrochemical reaction space, is configured to accommodate an electrolyte solution and a metal ingot therein, and have a flexible air electrode embedded in an inner wall of the flexible case. The follow-up adjustment module is configured to change a shape of the flexible case according to a size change of the metal ingot reduce the electrochemical reaction space. The drive mechanism is configured to control action of the follow-up adjustment module. According to the present disclosure, a large-sized standard cubic metal ingot is directly used as metal battery anode, the case is made of a flexible rubber material, thus with cooperation of the follow-up adjustment system, the shape of the case can be adjusted in real time according to the size of the ingot, so as to ensure the sustainability and stability of an electrochemical reaction process, thereby solving a technical problem that the performance of a large-sized metal battery gradually decreases as the reaction goes on, clearing a large technical obstacle for its application, and making the metal-air fuel battery fully exert a huge market application prospect and development potential.

In an embodiment, the flexible case is a square roof-less case with rounded corners made by demolding flexible rubber material; the follow-up adjustment module is fixedly connected to four side walls of the flexible case, and configured to push walls of the flexible case to deform elastically under action of an external force so as to compress inwards; and an electrolyte solution circulation interface connecting an electrolyte solution circulation system is provided at a bottom corner of the flexible case, for discharging surplus electrolyte solution during deformation of the case and performing sedimentation and purification under certain conditions.

In an embodiment, the follow-up adjustment module includes four rigid supporting rods fixedly inserted into vertical through holes provided in centers of the four side walls of the flexible case; a sliding block is fixedly connected at a bottom of each rigid supporting rod, and a threaded through hole is provided at a side of each sliding block, and a lead screw arranged horizontally is in thread connection with the threaded through hole, and an end of the lead screw is in transmission connection with the drive mechanism, where the rigid supporting rods act as a direct force-applying component for the deformation of the case, the four rigid supporting rods can move toward the center under the action of the lead screw, thereby pushing the walls of the case to elastically deform and compress inwards. The drive mechanism of the rigid supporting rods is not specifically limited, and may also adopt other structures besides a screw-nut structure. For example, four telescopic cylinders or hydraulic cylinders may be provided, which can also drive four rigid supporting rods to move horizontally, thereby realizing the compression of the side walls of the case.

In an embodiment, a fixing bracket is provided above the flexible case, a camera is movably mounted on the fixing bracket, a controller is connected to the camera and electrically connected to the drive mechanism, and the metal ingot is fixed to a lower end of the fixing bracket through a bolt.

In an embodiment, a sliding groove is provided at each of four corners on a top of the flexible case, and four horizontal connecting rods, each located in the sliding groove, are fixedly connected to side walls of the fixing bracket. The sliding grooves serve as a supporting component for the metal ingot, camera and wires, and may constrain the wall sides of the case to be uniformly inwardly compressed.

In an embodiment, the drive mechanism includes a drive motor, the drive motor is in transmission connection with a drive bevel gear through a coupling, a driven bevel gear arranged horizontally engages with the drive bevel gear, a disc-type bevel gear is coaxially provided above the driven bevel gear, a compression bevel gear is fixedly provided at an end of each rigid supporting rod, and four compression bevel gears are in transmission connection with the disc-type bevel gear respectively.

In an embodiment, the metal-air fuel battery system with the large-sized anode of follow-up adjustment further includes a first bottom plate and a second bottom plate, a bottom of the first bottom plate is fixedly connected with the second bottom plate via a plurality of telescopic rod; a guide groove toward a center is provided on each of four side walls of the first bottom plate, and the four rigid supporting rods are disposed vertically and movably in four guide grooves respectively; a compression bevel gear outer bearing pedestal is fixedly provided below an outer side of the guide groove, and a compression bevel gear bearing connected with the compression bevel gear is mounted on the compression bevel gear outer bearing pedestal; a disc-type bevel gear bearing pedestal is mounted on an inner bottom of the first bottom plate, a driven bevel gear bearing pedestal coaxial with the disc-type bevel gear bearing pedestal is mounted on a top of the second bottom plate, the disc-type bevel gear bearing pedestal and the driven bevel gear bearing pedestal are configured to connect with a disc-type bevel gear shaft and a gear shaft of the driven bevel gear respectively; a drive bevel gear bearing pedestal is provided on a side of the driven bevel gear bearing pedestal, and a drive motor mounting through hole is provided on the second bottom plate outside the drive bevel gear bearing pedestal.

In an embodiment, a temperature sensor, a flow rate sensor and a viscosity sensor are embedded in the electrolyte solution circulation interface, and the temperature sensor, the flow rate sensor and the viscosity sensor are electrically connected to the controller, respectively.

In an embodiment, the electrolyte solution circulation system includes a water tank and a sedimentation tank, the electrolytic solution circulation interface communicates with the water tank through a first water inlet pipe, the water tank communicates with the flexible case through a first water return pipe, the water tank communicates with a lower part of the sedimentation tank through a second water inlet pipe, the water tank communicates with an upper part of the sedimentation tank through a second water return pipe, each of the first water inlet pipe, the first water return pipe, the second water inlet pipe and the second water return pipe is provided with a water pump.

The present disclosure achieves the following technical effects over the prior art:

The present disclosure enables a direct use of the large-sized standard cubic metal ingot in a metal battery by means of a follow-up adjustment system, a distance between the battery anode, i.e. metal ingot, and the battery cathode, i.e. air electrode, can be maintained at a relatively constant value to ensure that the electrochemical reaction goes on continuously and steadily, so that the metal-air fuel battery is always in a high efficiency power generation operation.

BRIEF DESCRIPTION OF THE DRAWINGS

In order to more clearly illustrate embodiments of the present disclosure or technical solutions in the conventional technology, accompanying drawings used in the embodiments will now be described briefly. It is obvious that the drawings in the following description are only some embodiments of the present disclosure, and those skilled in the art can obtain other drawings from these drawings without involving any inventive effort.

Figure 1:
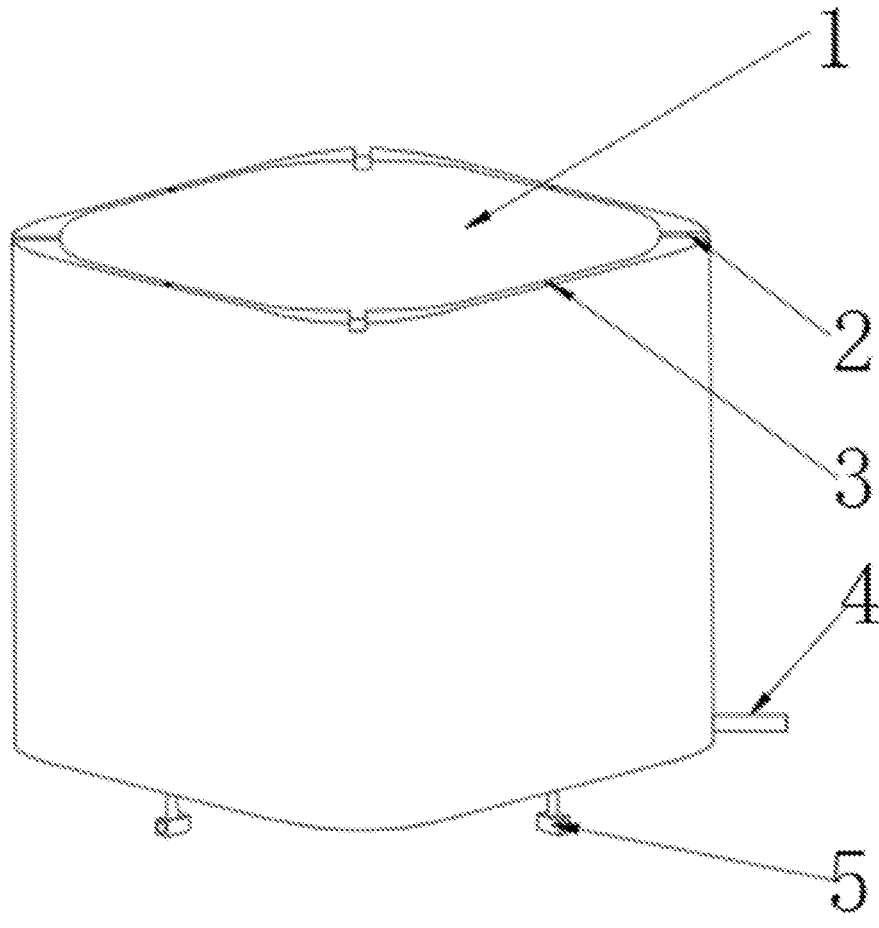
FIG. 1 is a schematic structural view of a flexible case according to the present disclosure.

DESCRIPTION OF REFERENCE NUMERALS 1, flexible case; 2, sliding groove; 3, through hole; 4, electrolyte solution circulation interface; 5, rigid supporting rod; 6, lead screw; 7, compression bevel gear; 8, disc-type bevel gear; 9, drive motor; 10, coupling; 11, drive bevel gear; 12, driven bevel gear; 13, first bottom plate; 14, guide groove; 15, compression bevel gear outer bearing pedestal; 16, telescopic rod; 17, driven bevel gear bearing pedestal; 18, disc-type bevel gear bearing pedestal; 19, drive bevel gear bearing pedestal; 20, drive motor mounting through hole; 21, second bottom plate; 22, water tank; 23, sedimentation tank; 24, metal ingot; 25, fixing bracket; 26, camera; and 27, water pump.

DETAILED DESCRIPTION OF THE EMBODIMENTS

In the following, technical solutions in the embodiments of the present disclosure will be clearly and completely described with reference to the drawings in the embodiments of the present disclosure. Obviously, the described embodiments are only a part of the embodiments of the present disclosure, but not all the embodiments. Based on the embodiments of the present disclosure, all other embodiments obtained by a person of ordinary skill in the art without involving any inventive effort are within the scope of the present disclosure.

The present disclosure intends to provide a metal-air fuel battery system with follow-up adjustment of a large-sized anode, so as to solve the problems existing in the prior art described above, and a real-time adjustment of a size can be achieved by a follow-up adjustment mechanism according to a size change of a metal ingot during a reaction process, so as to ensure the sustainability and stability of an electrochemical reaction, thereby improving performance reliability of the metal-air fuel battery.

To further clarify the above objects, features and advantages of the present disclosure, a more particular description of the disclosure will be rendered by reference to the accompanying drawings and specific embodiments thereof.

Explanation of Terms

A follow-up adjustment system, also called a servo system or tracking system, is a feedback adjustment system, an output of which changes with a certain accuracy as an input thereof varies randomly. A metal-air fuel battery, as a special class of fuel battery, uses metal as a fuel, and performs an oxidation-reduction reaction with oxygen in air to generate electric energy. An electrolyte solution is used as a medium in chemical batteries and electrolytic capacitors, and is a sodium chloride solution with a concentration of 10% in the present disclosure. A standard cubic metal ingot is a metal cube of 99.9% purity with a side length of 1 m.

Figure 2:
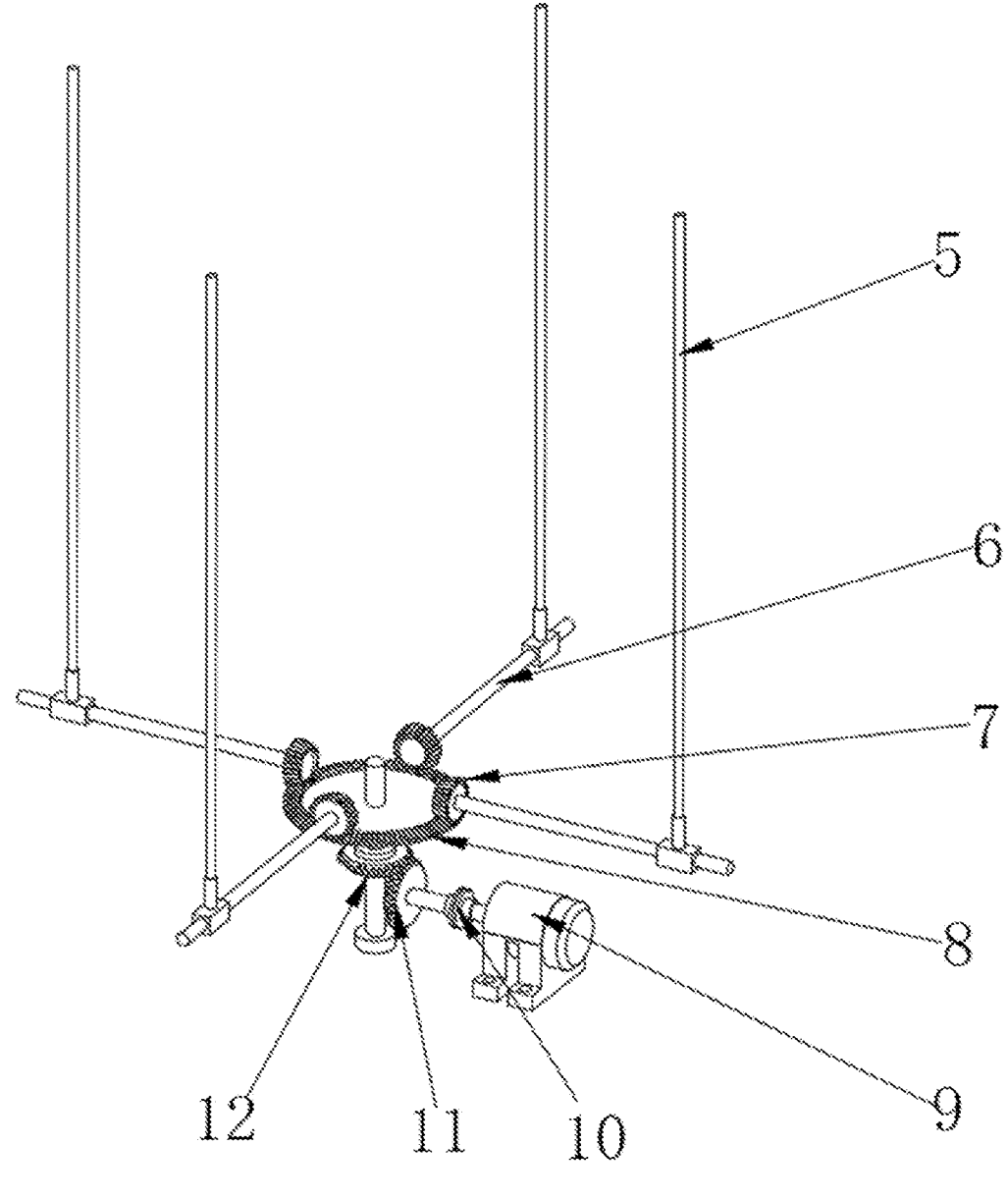
FIG. 2 is a schematic view of a follow-up adjustment module and a drive mechanism according to the present disclosure.
Figure 6:
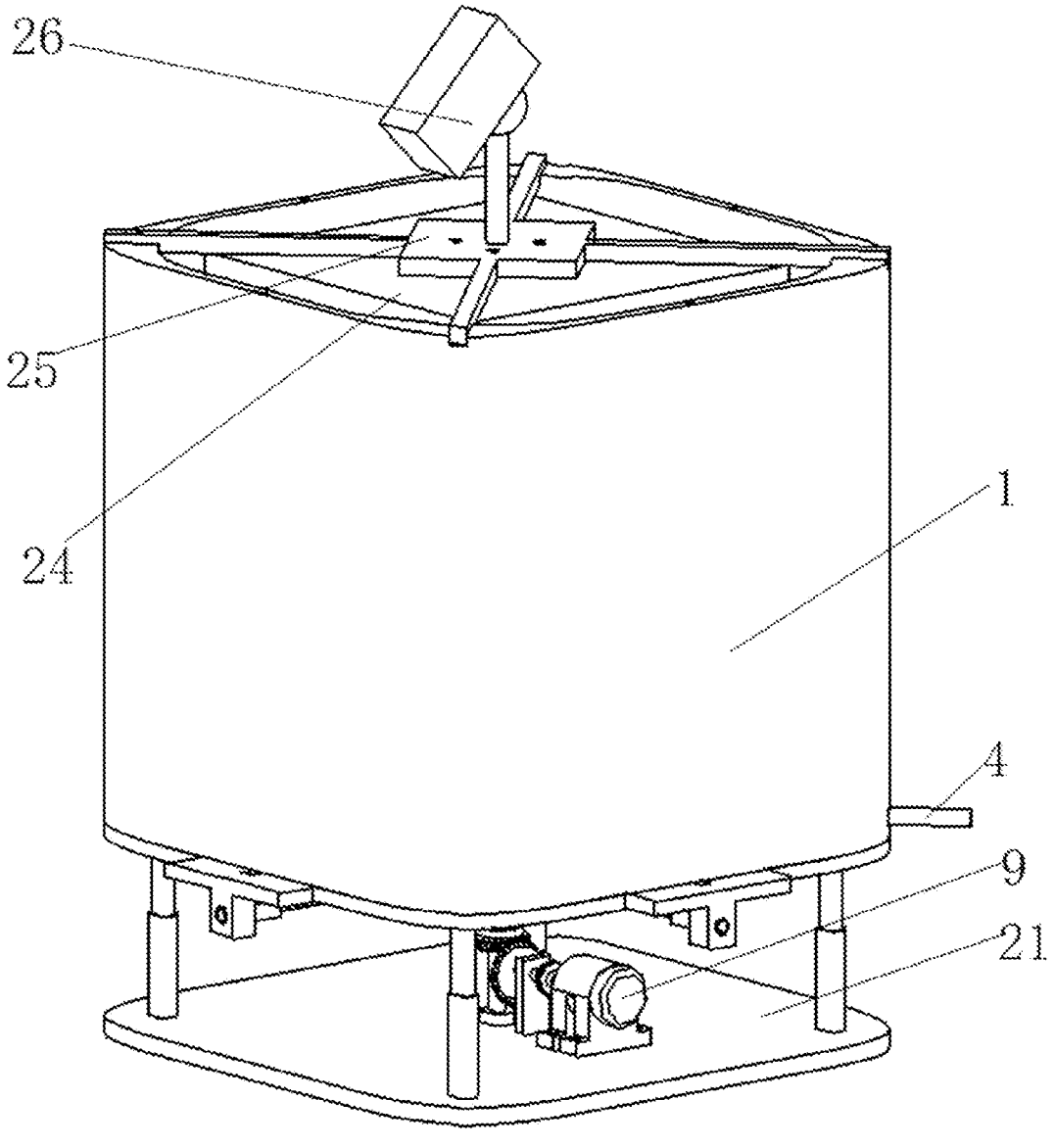
FIG. 6 is a schematic view showing an initial state of a whole structure of a metal-air fuel battery system with follow-up adjustment of a large-sized anode according to the present disclosure.

Referring to FIGS. 1, 2 and 6, the present disclosure provides a metal-air fuel battery system with follow-up adjustment of a large-sized anode, which includes a flexible case 1. The flexible case 1 is made of rubber material, and configured to accommodate an electrolyte solution and a metal ingot 24 therein. In the present disclosure, a large-sized cubic metal ingot is used as an anode, and an interior of the flexible case 1 serves as an electrochemical reaction space, and a flexible air electrode is embedded in an inner wall of the flexible case 1 as a cathode; a follow-up adjustment module is connected to a side wall of the flexible case 1, which is capable of changing a shape of the flexible case 1 according to a size change of the metal ingot 24 to reduce the electrochemical reaction space; and a drive mechanism is configured to control action of the follow-up adjustment module. According to the present disclosure, a large-sized standard cubic metal ingot is directly used as the metal battery anode, the case of the large-sized standard cubic metal ingot is made of flexible rubber material, and thus with cooperation of the follow-up adjustment system, the shape of the case can be adjusted in real time according to the size of the ingot, so as to ensure the sustainability and stability of an electrochemical reaction process, and solve a technical problem that the performance of a large-sized metal battery gradually decreases as the reaction goes on.

Figure 7:
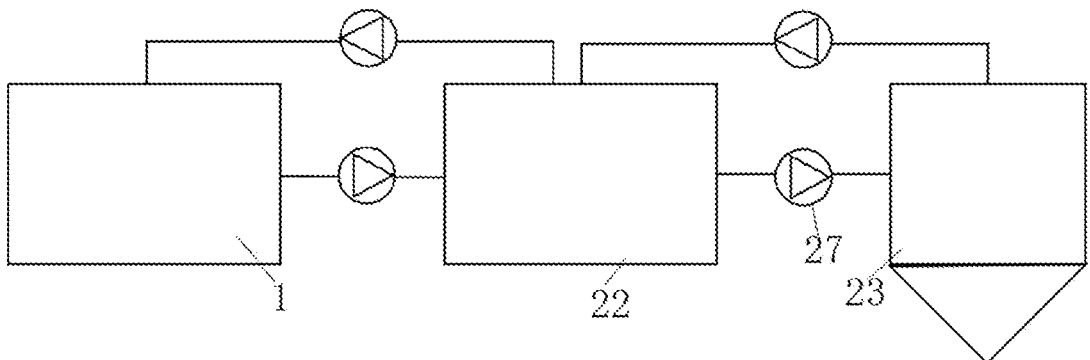
FIG. 7 is a schematic view showing a layout of an electrolyte solution circulation system according to the present disclosure.

Specifically, the flexible case 1, as a core component of the whole device, is a square roof-less case with rounded corners made by demolding flexible rubber material, and the follow-up adjustment mechanism makes it possible to change the shape of the case in real time with the change of the size of the metal ingot, so as to ensure the sustainability and stability of the reaction process; an electrolyte solution circulation interface 4 connecting an electrolyte solution circulation system is provided at a bottom corner of the flexible case 1, for discharging surplus electrolyte solution during deformation of the case and performing sedimentation and purification under certain conditions. As shown in FIG. 7, the electrolyte solution circulation system includes a water tank 22 and a sedimentation tank 23, the electrolytic solution circulation interface 4 communicates with the water tank 22 through a first water inlet pipe, the water tank 22 communicates with the flexible case 1 through a first water return pipe, the water tank 22 communicates with a lower part of the sedimentation tank 23 through a second water inlet pipe, the water tank 22 communicates with an upper part of the sedimentation tank 23 through a second water return pipe; each of the first water inlet pipe, the first water return pipe, the second water inlet pipe and the second water return pipe is provided with a water pump 27, the electrolytic solution circulation interface 4 connects the reaction tank to the circulation system; the water tank serves as a temporary storage space for the electrolyte solution, and at the same time performs the sedimentation and purification of the electrolyte solution when certain conditions are met, ensuring that the electrochemical reaction is efficiently and stably carried out. The follow-up adjustment module includes four rigid supporting rods 5 fixedly inserted into vertical through holes 3 provided in inner centers of the four side walls of the flexible case 1; a sliding block is fixedly connected at a bottom of each rigid supporting rod 5, and an axial threaded through hole along a direction of a lead screw 6 is provided at a side of each sliding block, and the lead screw 6 arranged horizontally is in thread connection with the threaded through hole, thereby converting a rotational movement of the lead screw 6 into a translational movement of the rigid supporting rod 5, and an end of the lead screw 6 is in transmission connection with the drive mechanism. The drive mechanism includes a drive motor 9, the drive motor 9 is in transmission connection with a drive bevel gear 11 through a coupling 10, a driven bevel gear 12 arranged horizontally engages with the drive bevel gear 11, a disc-type bevel gear 8 is coaxially provided above the driven bevel gear 12, a compression bevel gear 7 is fixedly provided at an end of each rigid supporting rod 5, four compression bevel gears 7 are in transmission connection with the disc-type bevel gear 8 respectively. The rigid supporting rods 5 act as a direct force-applying component for the deformation of the case, and the drive mechanism can drive the lead screw 6 to rotate, which causes the sliding block be in thread connection with the lead screw 6 to move horizontally along the lead screw 6, so that the four rigid supporting rods 5 can move toward the center under the action of the lead screw 6, thereby pushing the walls of the case to elastically deform and compress inwards.

Figure 4:
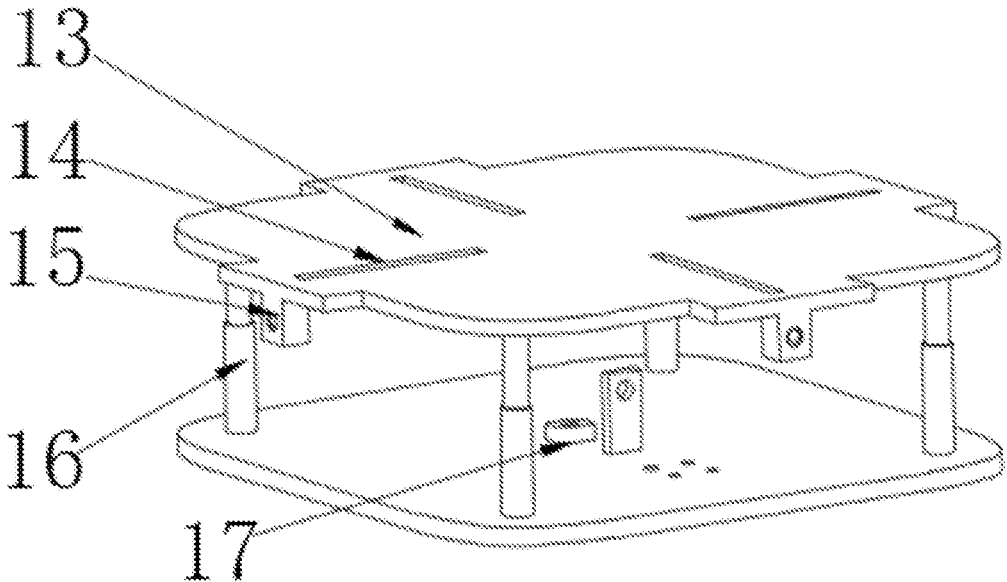
FIG. 4 is a schematic structural view of a first bottom plate and a second bottom plate according to the present disclosure.
Figure 5:
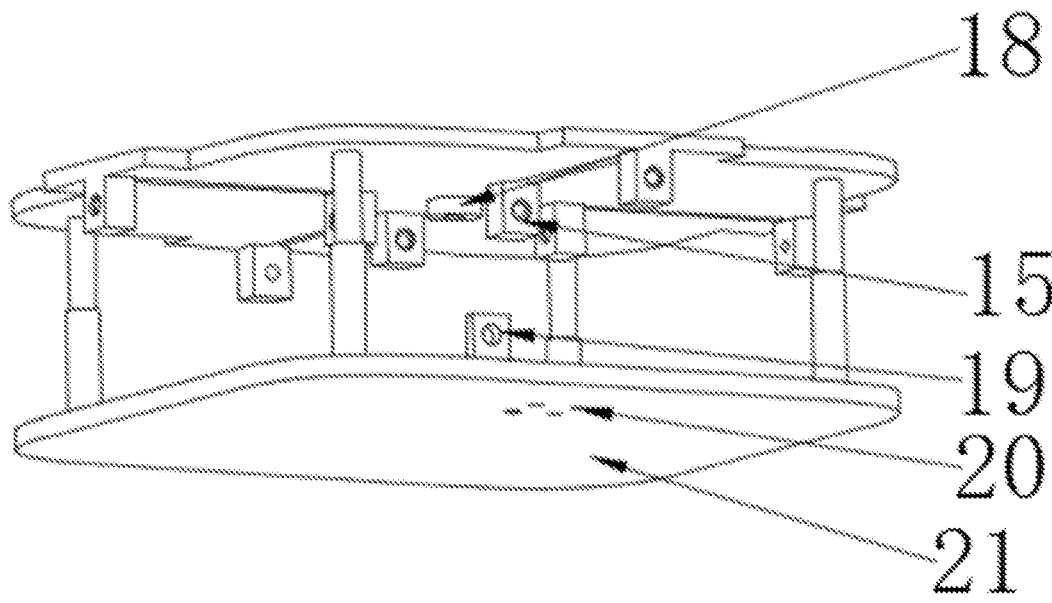
FIG. 5 is another perspective view of the first bottom plate and the second bottom plate according to the present disclosure.

In order to make the transmission mechanism more stable and reliable, in the present disclosure, a first bottom plate 13 and a second bottom plate 21 are uniquely designed. As shown in FIGS. 4 and 5, a bottom of the first bottom plate 13 is fixedly connected with the second bottom plate 21 via a plurality of telescopic rods 16; a guide groove 14 toward a center direction is provided on each of four side walls of the first bottom plate 13, and the four rigid supporting rods 5 are disposed vertically and movably in four guide grooves 14 respectively; a compression bevel gear outer bearing pedestal 15 is fixedly provided below an outer side of the guide groove 14, and a compression bevel gear bearing connected with the compression bevel gear is mounted on the compression bevel gear outer bearing pedestal 15; a disc-type bevel gear bearing pedestal 18 is mounted on an inner bottom of the first bottom plate 13, a driven bevel gear bearing pedestal 17 coaxial with the disc-type bevel gear bearing pedestal 18 is mounted on a top of the second bottom plate 21, the disc-type bevel gear bearing pedestal 18 and the driven bevel gear bearing pedestal 17 are configured to connect with a disc-type bevel gear shaft and a gear shaft of the driven bevel gear; a drive bevel gear bearing pedestal 19 is provided on a side of the driven bevel gear bearing pedestal 17, and a drive motor mounting through hole 20 is provided on the second bottom plate 21 outside the drive bevel gear bearing pedestal 19. The drive motor mounting through hole 20 is connected with the drive motor 9 through a bolt, so that each bevel gear structure and the drive motor 9 can be mounted at corresponding positions on the bottom plates. The first bottom plate 13 is placed under the flexible case 1, the bottom surface of the flexible case 1 is supported by the first bottom plate 13, preventing the bottom surface of the case from bulging downward during deformation. The rigid supporting rod 5 passing through the rubber case passes through the guide groove 14 to engage with the lead screw 6, and the guide groove 14 is used to guide the translational movement of the rigid supporting rod 5, making the supporting rod to move only along a direction of the groove. The telescopic rods 16 are used to adjust a spacing distance between the two bottom plates, facilitating the assembly of the drive mechanism.

Figure 3:
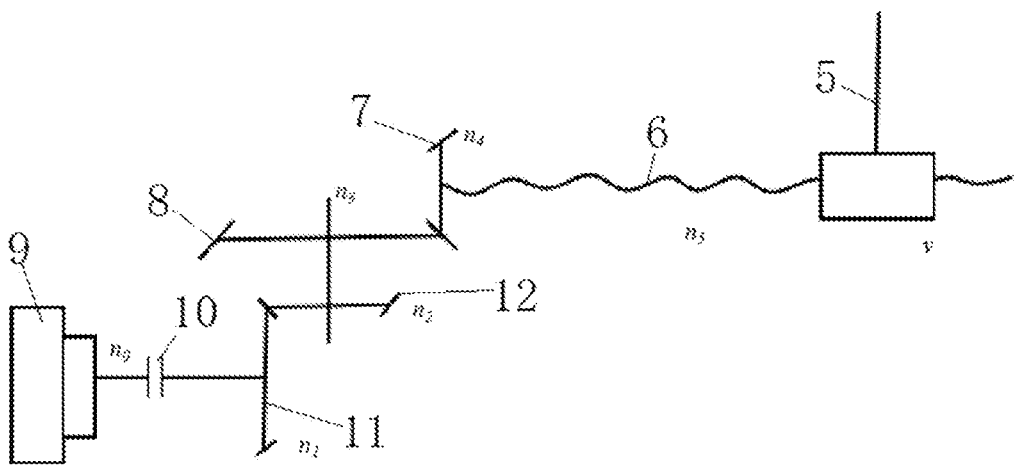
FIG. 3 is a transmission diagram of the drive mechanism according to the present disclosure.

With reference to FIG. 3, the transmission calculation of the drive mechanism is described as follows:

Given that a rotational speed of the drive motor is $n_0$, a rotational speed of the drive bevel gear $n_1$ is equal to $n_0$ as the drive bevel gear is connected with a shaft of the drive motor through the coupling; a gear ratio of the drive bevel gear to the driven bevel gear is $i_1$, then a rotational speed of the driven bevel gear $n_2$ meets the following formula:

$$n_2 = i_1 \cdot n_1.$$

The driven bevel gear and the disc-type bevel gear are coaxially fixed, thus a rotational speed of the disc-type bevel gear $n_3$ is equal to $n_2$, a gear ratio of the disc-type bevel gear to the four compression bevel gears is $i_2$, then a rotational speed of the compression bevel gears $n_4$ meets the following formula:

$$n_4 = n_3 \cdot i_2.$$

The compression bevel gear is fixed to the lead screw, and thus a rotational speed of the lead screw $n_5$ is equal to $n_4$. Given that a lead of the lead screw is d, a speed of linear movement of the nut, i.e. a speed of horizontal movement of the supporting rod v, is:

$$v = n_s \cdot d.$$

Integrating the above formulas, the relationship between the horizontal movement speed v of the supporting rod and the rotational speed of the motor $n_0$ is as follows:

$$v = i_1 \cdot i_2 \cdot d \cdot n_0.$$

In an embodiment, a sliding groove 2 is provided at each of four corners on a top of the flexible case 1, a fixing bracket 25 is provided above the flexible case 1, a camera 26 is movably mounted on the fixing bracket 25, and a controller is connected to the camera 26 and electrically connected to the drive mechanism; a temperature sensor, a flow rate sensor and a viscosity sensor are embedded in the electrolyte solution circulation interface 4, and the temperature sensor, the flow rate sensor and the viscosity sensor are electrically connected to the controller, respectively, and the controller adopts an existing microcontroller unit MCU. The metal ingot 24 is fixed to a lower end of the fixing bracket 25 through a bolt, four horizontal connecting rods, each located in the sliding groove 2, are fixedly connected to side walls of the fixing bracket 25. The fixing bracket 25 has wires embedded therein to connect the air electrode embedded in the wall of the flexible case 1 and the metal ingot, thereby conducting the electric circuit. The camera 26 can rotate 360 degrees around the mounting rod of the fixing bracket 25 to acquire image information for determining the reaction state of the metal ingot 24 and the spacing distance between the metal ingot and the case.

The basic control principle of the present disclosure is as follows: information such as the electrolyte solution temperature, flow rate, viscosity, and rotational speed of the motor collected by the sensors, and the spacing distance data between the metal ingot and the wall collected by the camera are input to the controller MCU, the MCU processes these data, for example, the MCU compares the current spacing distance with a pre-set desired value, and sends command information to the drive motor and the water pump according to its built-in algorithm; the drive motor adjusts the working state after receiving the commands, the transmission mechanism connected thereto transmits and converts the rotation of the drive motor into the movements of the rigid supporting rods 5 to change the shape of the flexible case 1, so as to realize follow-up adjustment of the size of the flexible case 1. Meanwhile, if the flexible case 1 is compressed, the MCU controls the water pump 27 between the reaction tank inside the flexible case 1 and the water tank 22 to draw the surplus electrolyte solution inside the flexible tank 1 to the circulation water tank; if the shape of the flexible case 1 is restored, the water pump 27 re-pumps the electrolyte solution in the water tank 22 into the flexible case 1. When the MCU receives viscosity data from the viscosity sensor that exceeds a certain threshold, the MCU commands the water pump 27 between the water tank and the sedimentation tank 23 to pump the metal hydroxide suspension in the water tank 22 into the sedimentation tank 23 for sedimentation, and then the supernatant is returned to the water tank 22 as a storage solution for the reaction tank in the flexible case 1.

Embodiment One

In this embodiment, taking magnesium metal as a specific example, in an initial state, i.e., when the electrochemical reaction has not started, the flexible case 1 without any elastic deformation has a maximum inner space, and can accommodate a standard-sized cubic magnesium ingot with a maximum size of 1 m×1 m×1 m; the flexible case 1 is placed on the bottom plates, before the operation of the magnesium battery, the drive mechanism, the bottom plate, the flexible case 1 and the attachments are firstly connected, and then the standard cubic magnesium ingot is fixed to the fixing bracket through a bolt. The fixing bracket is mounted at the top end of the flexible case 1, and with the cooperation of the sliding grooves at the four corners, suspends the magnesium ingot inside the flexible case 1 is fitted through the sliding grooves, thereby keeping four sides of the magnesium ingot in parallel with the wall sides of the flexible case 1. The signal interfaces of the camera and the sensors are connected to the controller MCU by wires, and then the prepared sodium chloride solution of 10% concentration is pumped into the flexible case 1 through the electrolyte solution circulation interface 4 by a water pump until the whole magnesium ingot 24 is submerged, then the electrochemical reaction starts, and the magnesium battery starts to continuously generate electricity.

After the magnesium ingot 24 has reacted for a certain initial period, the camera 26 starts rotating to capture image information, the controller MCU obtains and analyses real-time distance data between the edge of the magnesium ingot 24 and the wall of the case, and sends a start command to the drive motor to make it rotate forward when the minimum spacing distance value $L_{min}$ is greater than 20 mm, and then the drive mechanism pushes the walls of the flexible case 1 to compress. The drive motor 9 is provided with a rotation speed sensor connected to the controller to control the rotational speed. When $L_{min}$ is less than or equal to 10 mm, the controller MCU: sends a suppression signal to make the drive motor 9 reverse and push the walls of the flexible case 1 to expand. When the viscosity value output by the viscosity sensor exceeds the pre-set threshold, the MCU commands the water pump 27 between the water tank 22 and the sedimentation tank 23 to pump the suspension liquid in the water tank 22 into the sedimentation tank 23 for sedimentation, the sediment is drawn out from the bottom, and the supernatant is returned to the water tank 22.

Figure 8:
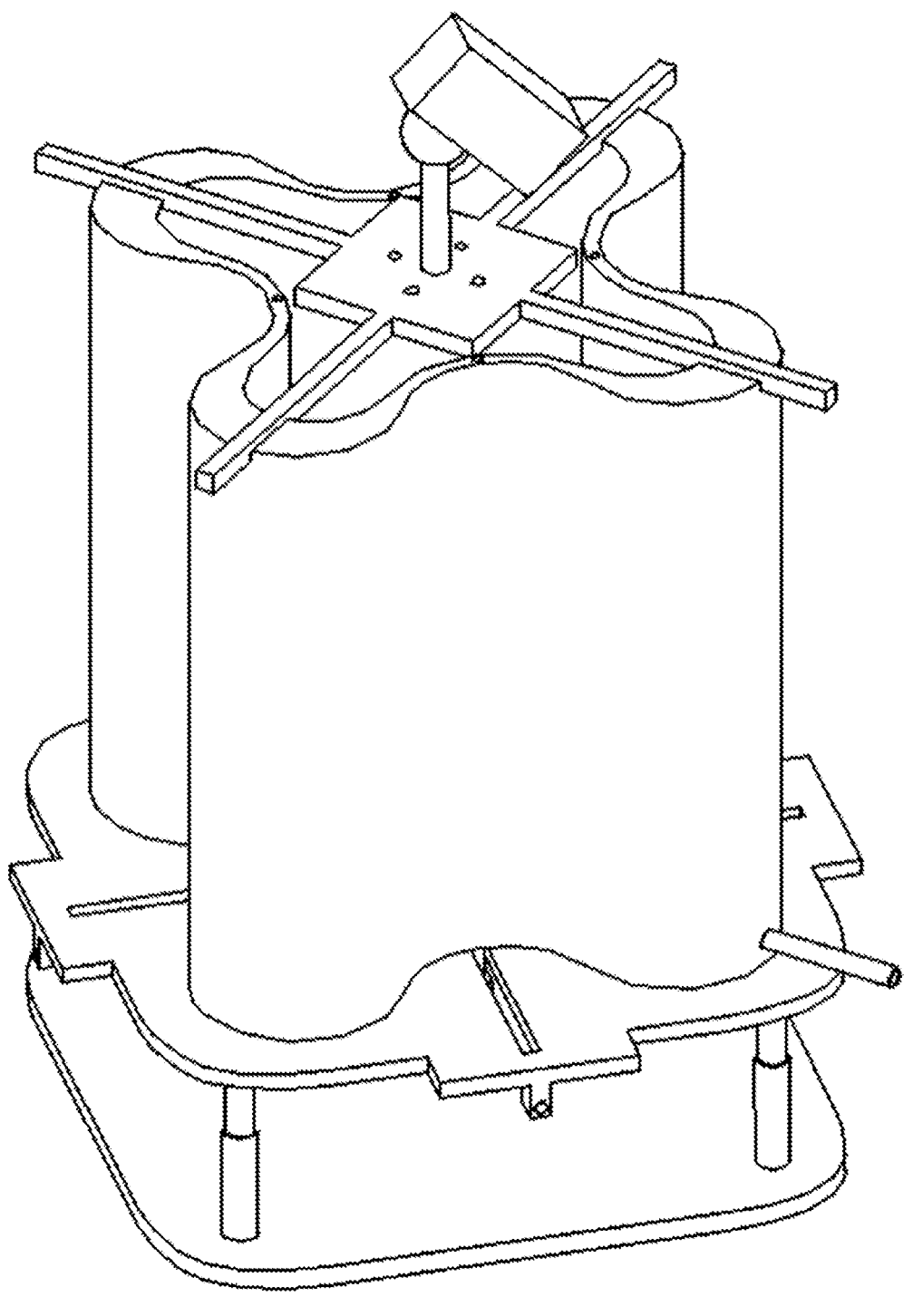
FIG. 8 is a schematic view showing a compression state of the whole structure of the metal-air fuel battery system with follow-up adjustment of the large-sized anode according to the present disclosure.

As shown in FIG. 8, the follow-up adjustment system enables the direct use of the large-sized standard cubic magnesium ingot in the magnesium air fuel battery, the distance between the battery anode, i.e. magnesium ingot, and the battery cathode, i.e. air electrode, can be maintained at the relatively constant value to ensure that the electrochemical reaction goes on continuously and steadily, so that the magnesium air fuel battery is always in a high efficiency power generation operation.

It should be noted that, in the description of the present disclosure, orientation or position relationships indicated by terms such as "center", "top", "bottom", "left", "right", "vertical", "horizontal", "inner", "outer", are based on the orientation or position relationships shown in the accompanying drawings, which is only for the convenience of describing the present disclosure and simplifying the description, rather than indicating or implying that the indicated device or element must be in a particular orientation, be constructed and operated in a particular orientation, and thus should not be construed to limit the present disclosure. In addition, the terms "first" and "second" are only used for descriptive purposes, and cannot be construed as indicating or implying relative importance.

The principles and implementation of the present disclosure have been described herein with specific examples, and the above embodiments are presented to aid in the understanding of the methods and core concepts of the present disclosure; meanwhile, those skilled in the art may make some changes in both the detailed description and an application scope according to the teachings of this disclosure. In conclusion, the contents of the description should not be construed as limiting the disclosure.

What is claimed is:

1. A metal-air fuel battery system with follow-up adjustment of an anode, comprising: a flexible case, a follow-up adjustment module and a drive mechanism; wherein the flexible case, as an electrochemical reaction space, is configured to accommodate an electrolyte solution and a metal ingot therein, and have a flexible air electrode embedded in an inner wall of the flexible case;

the follow-up adjustment module is configured to change a shape of the flexible case according to a size change of the metal ingot to reduce the electrochemical reaction space; and the drive mechanism is configured to control action of the follow-up adjustment module.

2. The metal-air fuel battery system with follow-up adjustment of the anode according to claim 1, wherein the flexible case is a square roof-less case with rounded corners made by demolding flexible rubber material; the follow-up adjustment module is fixedly connected to four side walls of the flexible case, and configured to push walls of the flexible case to deform elastically under action of an external force so as to compress inwards; and an electrolyte solution circulation interface connecting an electrolyte solution circulation system is provided at a bottom corner of the flexible case.

3. The metal-air fuel battery system with follow-up adjustment of the anode according to claim 2, wherein the follow-up adjustment module comprises four rigid supporting rods fixedly inserted into vertical through holes provided in centers of the four side walls of the flexible case; a sliding block is fixedly connected at a bottom of each rigid supporting rod, and a threaded through hole is provided at a side of each sliding block, and a lead screw arranged horizontally is in thread connection with the threaded through hole, and an end of the lead screw is in transmission connection with the drive mechanism.

4. The metal-air fuel battery system with follow-up adjustment of the anode according to claim 3, wherein the drive mechanism comprises a drive motor, the drive motor is in transmission connection with a drive bevel gear through a coupling, a driven bevel gear arranged horizontally engages with the drive bevel gear, a disc-type bevel gear is coaxially provided above the driven bevel gear, a compression bevel gear is fixedly provided at an end of each rigid supporting rod, and four compression bevel gears are in transmission connection with the disc-type bevel gear respectively.

5. The metal-air fuel battery system with follow-up adjustment of the anode according to claim 4, further comprising a first bottom plate and a second bottom plate, a bottom of the first bottom plate is fixedly connected with the second bottom plate via a plurality of telescopic rods; a guide groove toward a center is provided on each of four side walls of the first bottom plate, and the four rigid supporting rods are disposed vertically and movably in four guide grooves respectively; a compression bevel gear outer bearing pedestal is fixedly provided below an outer side of the guide groove, and a compression bevel gear bearing connected with the compression bevel gear is mounted on the compression bevel gear outer bearing pedestal; a disc-type bevel gear bearing pedestal is mounted on an inner bottom of the first bottom plate, a driven bevel gear bearing pedestal coaxial with the disc-type bevel gear bearing pedestal is mounted on a top of the second bottom plate, the disc-type bevel gear bearing pedestal and the driven bevel gear bearing pedestal are configured to connect with a disc-type bevel gear shaft and a gear shaft of the driven bevel gear respectively; a drive bevel gear bearing pedestal is provided on a side of the driven bevel gear bearing pedestal, and a drive motor mounting through hole is provided on the second bottom plate outside the drive bevel gear bearing pedestal.

6. The metal-air fuel battery system with follow-up adjustment of the anode according to claim 2, wherein a fixing bracket is provided above the flexible case, a camera is movably mounted on the fixing bracket, and a controller is connected to the camera, and electrically connected to the drive mechanism.

7. The metal-air fuel battery system with follow-up adjustment of the anode according to claim 6, wherein a sliding groove is provided at each of four corners on a top of the flexible case, and four horizontal connecting rods, each located in the sliding groove, are fixedly connected to side walls of the fixing bracket.

8. The metal-air fuel battery system with follow-up adjustment of the anode according to claim 6, wherein a temperature sensor, a flow rate sensor and a viscosity sensor are embedded in the electrolyte solution circulation interface, and the temperature sensor, the flow rate sensor and the viscosity sensor are electrically connected to the controller, respectively.

9. The metal-air fuel battery system with follow-up adjustment of the anode according to claim 8, wherein the electrolyte solution circulation system comprises a water tank and a sedimentation tank, the electrolytic solution circulation interface communicates with the water tank through a first water inlet pipe, the water tank communicates with the flexible case through a first water return pipe, the water tank communicates with a lower part of the sedimentation tank through a second water inlet pipe, the water tank communicates with an upper part of the sedimentation tank through a second water return pipe; and each of the first water inlet pipe, the first water return pipe, the second water inlet pipe and the second water return pipe is provided with a water pump.

* * * * *